Figure 1:
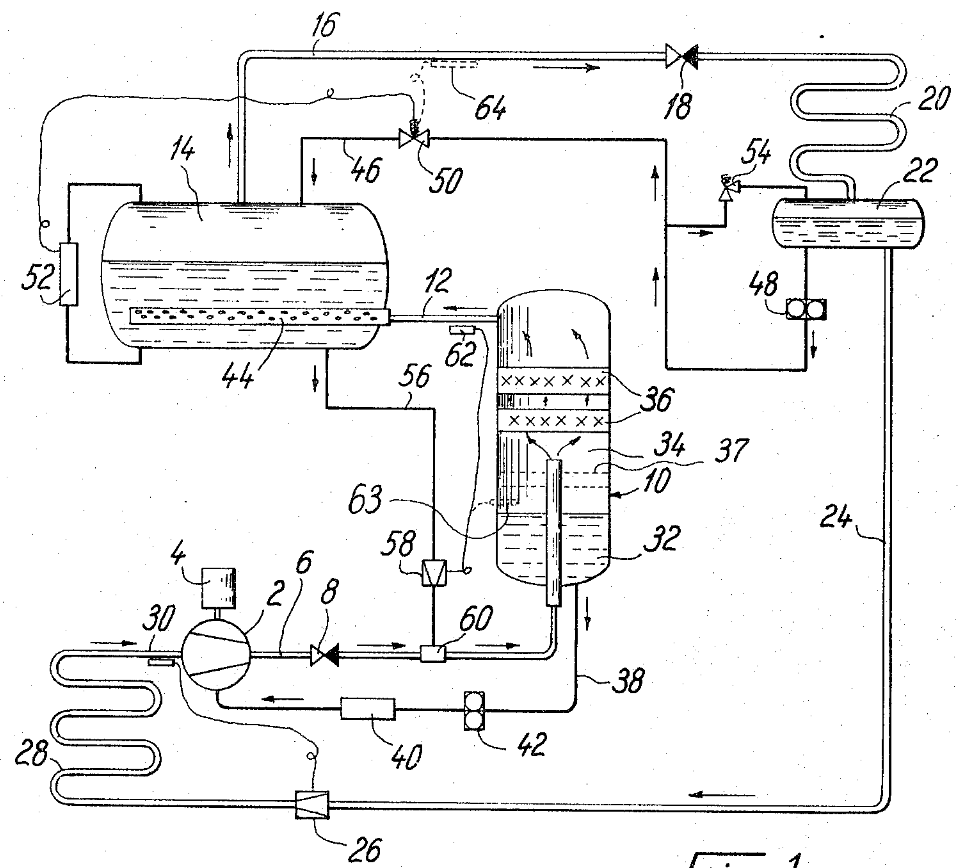

United States Patent [19]
Villadsen

[11] 3,850,009
[45] Nov. 26, 1974

[54] CLEANING OF PRESSURIZED CONDENSABLE GAS

[75] Inventor: Vagn Hovgaard Villadsen, Viby J., Denmark

[73] Assignee: Aktieselskabet Thomas Ths. Sabroe & Co., Hojbjerg, Denmark

[22] Filed: July 18, 1973

[21] Appl. No.: 380,242

[52] U.S. Cl. .......................... 62/473, 62/470, 418/97
[51] Int. Cl. .......................... F25b 43/02
[58] Field of Search ........ 418/97; 62/470, 473, 468, 62/84

[56] References Cited

UNITED STATES PATENTS

| | | | |
|---|---|---|---|
| 2,959,934 | 11/1960 | Ross | 62/470 |
| 3,079,763 | 3/1963 | Schneider | 62/470 |
| 3,408,828 | 11/1968 | Soumerai | 62/470 |
| 3,534,564 | 10/1970 | Miller | 62/473 |
| 3,710,590 | 1/1973 | Kocher | 62/470 |

*Primary Examiner*—William L. Freeh
*Assistant Examiner*—Gregory Paul LaPointe
*Attorney, Agent, or Firm*—Craig & Antonelli

[57] ABSTRACT

A compressor system such as a refrigerating system comprising a compressor for discharging a condensable gas in the gaseous phase thereof, means for introducing oil into the compressor and an oil separator for separating oil from the discharged gas and return the oil to said introducing means, characterised in that the oil separator is divided in a primary separator having in known manner an oil colllection chamber from the primary separator and containing an amount of an oil rest out-washing liquid consisting of the gas in the condensed phase thereof, the secondary separator including means for bringing the gas into washing contact with the liquid for washing out at least most of the oil still remaining in the gas, the secondary separator having a gas outlet from which the gas is fed to a condenser for condensing at least some of the gas, the condenser having a receiver for the condensed gas, this receiver being connected to the secondary separator so as to be operable to continuously or intermittently supply condensed gas to the secondary separator, this separator further having an outlet for condensed gas and means for continuously or intermittently supplying condensed gas from this outlet to means for injecting the condensed gas into the flow of gaseous gas passing or leaving the compressor, before or when the gas enters the primary oil separator.

4 Claims, 2 Drawing Figures

PATENTED NOV 26 1974 3,850,009

CLEANING OF PRESSURIZED CONDENSABLE GAS

In compressor driven systems for compressing a condensable gas e.g., in refrigeration systems or LPG-gas tank filling systems, it is often desirable to use a compressor of the screw type, this type having certain advantages over other compressor types. It is a specific feature of the screw compressor, however, that it is necessary to introduce considerable amounts of lubrication oil in the gas being compressed, so that care should be taken to afterwards separate the oil from the compressed gas and to supply fresh oil to the compressor for lubrication, rotor sealing and cooling of the compressor. This is done by means of an oil separator from which the oil is pressed back through an oil filter to the lubrication system of the compressor. Normally the gas-oil-mixture leaves the compressor with a relatively high temperature, and the separated oil, therefore, normally need cooling before it is reintroduced into the compressor, the working temperature of which should not be increased too much. In order to cool the oil there is normally used a special, relatively expensive oil cooler mounted in series with the said oil filter. It has been suggested to effect a total cooling of the compressor by injection of condensed gas directly into the working chamber of the compressor, but though it is hereby possible to reintroduce the oil without specific cooling this method is not too advantageous, because the injection of a cooling medium in the compressor chamber affects the efficiency of the compressor adversely.

Another problem resides in the separation of the relatively high amounts of oil in the gas so as to remove practically all oil therefrom. A normal oil separator is a rather "coarse" unit, and it is desirable, therefore, to let the gas from the oil separator pass a finer separator or filter in which the rest of the oil is separated or absorbed. Such fine separators or filters, however, are relatively expensive also in operation.

The present invention relates to a system such as a refrigerating system comprising a compressor for discharging a condensable gas in the gaseous phase thereof, means for introducing oil into the compressor and an oil separator for separating oil from the discharge gas and return the oil to said introducing means. It is the purpose of the invention to provide a system of this kind in which it is possible to obtain a fine separation of oil from the gas leaving the oil separator with the use of an extra oil separator of simple construction, and by simultaneous obtaining of a cooling of the oil being returned from the oil separator to the compressor.

According to the invention the oil separator is divided in a primary separator having in known manner an oil collection chamber from which the oil is returned to the compressor and a secondary separator mounted downstream of the flow of gas from the primary separator and containing an amount of an oil rest outwashing liquid consisting of the gas in the condensed phase thereof, the secondary separator including means for bringing the gas into washing contact with the liquid for washing out at least most of the oil still remaining in the gas is fed to a condenser for condensing at least some of the gas, the condenser having a receiver for the condensed gas, this receiver being connected to the secondary separator so as to be operable to continuously or intermittently supply condensed gas to the secondary separator, this separator further having an outlet for condensed gas and means for continuously or intermittently supplying condensed gas from this outlet to means for injecting the condensed gas into the flow of gaseous gas passing or leaving the compressor, before or when the gas enters the primary oil separator.

In this system the pressurized gas from the compressor will be subjected to a coarse oil separation in the primary oil separator, from which the oil is pumped back to the compressor and from which the gas is led further to the secondary separator in which at least the major part of the remaining oil will be washed out into the liquid gas. When the gas is thereafter condensed, e.g., in the normal condenser of a refrigeration plant, the condensed gas will be substantially free of oil, i.e., it can be reintroduced in the secondary separator as a clean gas fluid. An amount of the oil containing liquid gas in the secondary separator is introduced through the said injection means into the flow of gas from the compressor to the primary separator, this flow in advance having a higher oil concentration than the gas liquid to be injected therein. Hereby three different effects will be obtained, viz.

1. that the main flow of pressurized gas together with its oil contents will be cooled by the evaporation of the injected condensed gas, whereby the oil which is afterwards separated in the primary separator can be returned to the compresser with no or little extra cooling, 2. that the efficiency of the primary separator will be increased because the oil separates easier from the gas the lower its temperature is, and 3. that the oil contents in the cooling, condensed gas from the secondary separator is introduced or reintroduced into the main flow of oil rich gas, whereby oil from the secondary separator will be removed therefrom; of course, the oil contents of the main gas flow will increase correspondingly, but this increase is without any practical significance.

When in this manner the separated oil in the secondary separator is steadily fed to the main gas flow together with the condensed gas in which the oil is more or less suspended, and new oil-free condensed gas is supplied to the secondary separator from the said condenser, a state of oil-equilibrium may be obtained in the secondary separator, since the amount of oil leaving the separator for injection in the main gas flow together with the condensed gas will soon correspond to the amount of oil introduced into the separator together with the gas flow from the primary separator. The secondary separator can be considered as an oil filter in which the active filter element is automatically and continuously renewed, and the "element" will automatically be cleaned by recirculation through the primary separator, since it then changes its state into identity with the gas being cleaned and thereafter again — in the condenser — changing to its active state, now in cleaned condition.

Figure 2:
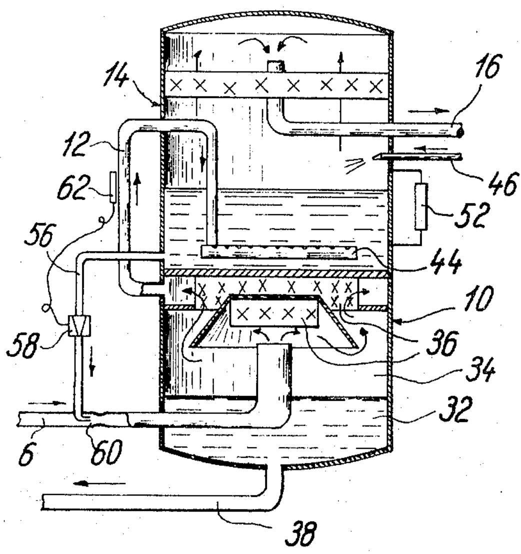

In the following the invention is described in more detail with reference to the accompanying drawing in which:

FIG. 1 is a diagrammatic view of a refrigeration system according to an embodiment of the invention, while FIG. 2 is a schematic sectional view of a combined primary and secondary oil separator.

The system shown in FIG. 1 comprises a screw compressor 2 driven by a motor 4 and having a discharge pipe 6 for pressurized gas. The gas is pressed through a non return valve 8 into a primary oil separator 10 of conventional construction and further through a pipe 12 to a secondary oil separator 14 from which the gas is pressed through a pipe 16 and a non return valve 18 to a condenser 20. The condensed gas is collected in a receiver 22 from which the condensed or liquid gas flows through a pipe 24 to its distination of application. In the example shown the system is a closed refrigeration system, in which the condensed gas is pressed through an expansion valve 26 to an evaporator or cooling element 28 from which the evaporated gas is returned in the usual manner to the suction side of the compressor 2 through a pipe 30.

As mentioned the primary oil separator 10 can be of conventional construction having a lower container portion 32 for the separated oil and an upper space 34 through which the gas moves up to the outlet pipe 12, whereby a substantial part of the oil contents of the gas will be separated by gravitation; in order to promote the separation there is normally used some baffle filter elements or other filter units 36 and 37. From the bottom chamber 32 the separated oil is returned to the compressor 2 through a pipe 38 in which there is provided an oil filter 40 and a pump 42. An oil cooler is not provided in this connection, as otherwise conventional.

In the embodiment shown the secondary oil separator consists of a lying cylindrical container 14 in which, adjacent the bottom thereof, there is mounted an elongated perforated tube 44 through which the pressurized gas from the pipe 12 is blown into the container 14. The container 14 has an inlet pipe 46 for liquid gas supplied from the condenser receiver 22 by means of a pump 48. In the pipe 46 there is inserted a solenoid valve 50 controlled by a level detector 52 for liquid gas in the container 14 in such a manner that the level of the liquid gas is maintained above the tube 44, but not higher than there is still a considerable free space above the liquid gas, so that the discharge velocity of the gas from the container 14 to the pipe 16 can be maintained relatively low. The pump 48 operates continuously and is shunted by means of an over-pressure valve 54 which will open when the solenoid valve 50 is closed.

To an outlet hole in the bottom of the container 14 there is connected a pipe 56 extending down to an injection chamber 60 in the exhaust pipe 6 from the compressor. In the pipe 56 there is mounted an automatic valve 58 controlled by a sensor 62 for the temperature of the pressurized gas, where the gas leaves the primary separator 10. Alternatively the sensor could be placed as shown at 63.

The major part of the oil in the gas from the compressor is separated in the primary separator and pressed back to the lubrication system of the compressor by means of the pump 42. Thereafter the gas is introduced into the secondary separator through the perforated tube 44, from which it bubbles up through the condensed gas fluid in the container 14 whereby practically all remaining oil in the gas is washed out therefrom. The gas thereafter passes further in the refrigeration system as already described.

After some time the liquid gas in the container 14 will get a certain contents of oil in admixture with the condensed gas, so both condensed gas and oil will pass through the pipe 56 to the injection chamber 60. The condensed gas will evaporate immediately after the injection into the pipe 6 and the evaporated gas integrates with the main gas flow both as far as gas and oil is concerned. By the evaporation the gas is cooled down, e.g., from 75° to 55° C. Due to this cooling the separated oil in the bottom 32 of the primary separator 10 can be returned to the compressor without further cooling, and thus a separate oil cooler can be avoided. As shown in dotted lines in FIG. 1 a baffle or demistor element 37 may be placed in the primary separator between the oil surface and the mouth of the pipe through which the main gas flow is introduced into the separator. If there are still non-evaporated drops of liquid gas in the main gas flow entering the separator 10 these drops will then be broken by falling down onto the warm demistor element, and it is ensured hereby that all liquid gas evaporates so that the oil in the bottom of the separator is kept free of gas.

The condensed gas leaving the container 14 through the pipe 56 is substituted by clean condensed gas pumped into the container 14 through the pipe 46 so as to maintain an almost constant level in the container. It should be mentioned that the condensed gas leaves the container 14 not only through the pipe 56, but also to some degree through the pipe 16, since some of the condensed gas will evaporate by the introduction of the gas through the pipe 44, the temperature of the condensed gas being at the boiling point thereof, e.g., 35° C, while the introduced gas is warmer, e.g., 55° C. Thus, some of the introduced gas will condense and some of the condensed gas will evaporate, but anyhow the gas leaving the container 14 through the pipe 16 will be practically oil free.

The rate of injection of condensed gas into the pipe 6 can be controlled automatically by means of the sensor 62, whereby the cooling effect may be maintained as low as necessary. On the other hand, apart from providing an optimal cooling of the gas, the injection also serves the purpose of removing oil from the secondary separator, and it will not always by all cooling media be possible to control the rate of injection optimally for both these purposes, but normally also a suitable compromise will be highly advantageous. As shown at 63 the temperature sensor may be located inside the separator 10, preferably between the oil surface and the demistor element 37, whereby if the temperature changes the sensor will almost immediately cause the valve 58 to be adjusted according to the requirements, i.e., so as to supply more or less cooling liquid from the tank 14 to the pipe 6 in response to the temperature increasing or decreasing, respectively.

A modified embodiment is shown in FIG. 2 in which the secondary separator 14 is mounted directly on the top of the primary separator 10. The mode of operation and the different pipe connections etc. are the same as in FIG. 1, and the same reference numerals are used. It is believed that it is thereafter not necessary to describe FIG. 2 in more detail. It should be mentioned that the injection of the condensed gas in the pipe 6 is done by means of an ejector, whereby the secondary oil separator need not be placed in a level above the injection chamber 60.

Instead of letting the gas bubble up through the condensed gas in the container 14 it will be possible to spray the condensed gas into a flow-through chamber for gaseous gas, such spray cleaning methods being known in the art. In this case the secondary separator could be made practically similar to the primary separator 10 shown in FIG. 1 with the addition of a row of spraying nozzles as shown at 46 in FIG. 2 for introducing the clean liquid gas into the flow of gaseous gas for washing purposes.

The automatic inlet valve 50 for condensed gas to the container 14 may alternatively be controlled by a temperature sensor 64 mounted in connection with the gas pipe 16, since a low outlet temperature of gas from the container 14 will indicate the condensed gas level therein to be too high and vice versa. This type of control is also usable where the oil is washed ourt from the gas flow by the said spray washing method. The invention is not limited to refrigerating systems having a closed recirculation system for the cooling medium, since it is applicable also in connection with pumping of LPG-gas for filling of gas tanks. It will be understood moreover that the advantages of the invention are not conditioned by the use of a screw compressor or another compressor type using large amounts of oil, since the use of the secondary oil separator in all cases will be advantageous for fine separation of the oil contents of a gas flow, also when the oil separated in the primary separator is not used again.

It is known that oil can be separated in a few types of cooling media, especially ammonia, in which the oil tends to precipitate, and it will be appreciated that the system according to the invention is not limited to that kind of cooling media, since it is unimportant whether the oil as in case of Freon is more or less suspended in the condensed gas.

Besides, the term "oil" should not be understood in a restricted sense since the method according to the invention is usable for cleaning gas also for other impurities. The invention also includes the described method of cleaning the condensable gas.

It is a separate important feature of the invention that the injection of the cooling condensed gas in the main gas flow is effected outside the compressor itself. For cooling the compressor in an ordinary refrigerating system it is known, as mentioned, to cool the oil returned to the compressor, and it is also known to inject condensed gas directly into the working room of the compressor in order to obtain an immediate cooling effect thereon. This latter method is usable also in connection with compressors other than screw compressors, but normally the injection of the condensed gas affects the efficiency of the compressor adversely. According to the invention the condensed gas is used for cooling the compressor indirectly, viz. by causing a highly direct cooling of the oil to be returned to the compressor, and it is thus obtained not only that the compressor is cooled as desired, but also that the injection can be effected in a very simple manner into a pipe rather than into the more complicated structure of the compressor. It will be appreciated that for obtaining this cooling the condensed gas to be injected may be taken directly from the condenser receiver 22, i.e., irrespectively of how the oil separation is made.

On the other hand, in the systems shown in the drawing it is not a necessary feature that the injection of condensed gas takes place in the pipe 6; of course, the desired returning of the oil to the gas flow as well as a cooling effect will be obtained also if the injection is made in the compressor or even in the suction pipe 30 of the compressor.

What is claimed is:

1. A compressor system comprising a compressor for discharging a compressed, condensable gas in the gaseous phase thereof and an oil separator for separating oil from the discharged gas, said oil separator being divided in a primary separator having an oil collection chamber from which the separated oil is let out from the separator and a secondary separator mounted downstream of the flow of gas from the primary separator and containing an amount of the gas in the condensed phase thereof, said secondary separator including means for bringing the gas flow into washing contact with the condensed gas for washing out oil from the gas flow, the secondary separator having a gas outlet from which the gas flow thus cleaned is fed to a condenser for condensing at least some of the gas, the condenser having a receiver for the condensed gas, said receiver being connected to the secondary separator so as to be operable to supply condensed gas thereto, the secondary separator further having an outlet for condensed gas connected to means for injecting condensed gas into the flow of gaseous gas passing the compressor, at an injection place located upstream of the point of introduction of the gas flow into the primary separator.

2. A system according to claim 1, characterised in that the means for injecting the condensed gas into the gas flow are located in the pressure pipe between the discharge port of the compressor and the oil separator.

3. A system according to claim 1 characterised in that the secondary oil separator is provided with a level control device for the condensed gas, and that this device is operatively connected with means for controlling the supply of condensed gas to the separator so as to cause the condensed gas level to be maintained substantially constant.

4. A system according to claim 1, characterised in that the means for supplying condensed gas to the said injection means are controlled in accordance with the temperature of the pressure gas from the compressor.

* * * * *